United States Patent [19]

Ishigaki et al.

[11] 4,396,727

[45] Aug. 2, 1983

[54] CATION EXCHANGE MEMBRANE AND PROCESS FOR PRODUCING THE SAME

[75] Inventors: Isao Ishigaki, Maebashi; Jiro Okamoto, Takasaki; Hiroyuki Harada, Yokohama, all of Japan

[73] Assignees: Japan Atomic Energy Research Institute; Chlorine Engineers Corp., Ltd., both of Tokyo, Japan

[21] Appl. No.: 318,979

[22] Filed: Nov. 9, 1981

[30] Foreign Application Priority Data

Nov. 17, 1980 [JP] Japan ................................ 55-161544

[51] Int. Cl.$^3$ .......................... B01J 39/20; C08F 8/00
[52] U.S. Cl. ................................. 521/27; 204/159.17
[58] Field of Search ...................... 521/27; 204/159.17

[56] References Cited

U.S. PATENT DOCUMENTS 4,311,573  1/1982  Mayhan et al. ................ 204/159.17

FOREIGN PATENT DOCUMENTS 54-11098  1/1979  Japan ..................................... 521/27

*Primary Examiner*—Joseph L. Schofer
*Assistant Examiner*—Peter F. Kulkosky
*Attorney, Agent, or Firm*—Browdy and Neimark

[57] ABSTRACT

A uniform cation exchange membrane having a certain fluorovinyl sulfonic acid monomer grafted onto a certain high-molecular substrate film which exhibits small electrical resistance and great physical strength is herein disclosed.

18 Claims, No Drawings

CATION EXCHANGE MEMBRANE AND PROCESS FOR PRODUCING THE SAME

FIELD OF THE INVENTION

The present invention relates to a novel cation exchange membrane. More particularly, the present invention relates to a cation exchange membrane having a certain fluorovinyl sulfonic acid monomer grafted onto a certain high-molecular substrate film.

BACKGROUND OF THE INVENTION

Cation exchange membranes used in electrolysis are required to have small electrical resistance, high resistance to oxidation, acids, alkalies, and great compression strength. Cation exchange membranes known to have these properties are perfluorocarbon membranes having sulfonyl-containing side chains, and most of them are produced as copolymer of a perfluorovinyl compound and a sulfonyl-containing monomer. For details of the method for producing them, see U.S. Pat. Nos. 3,784,399, 3,770,567 and 3,909,378. Although these membranes have good properties, their price is very high since the preparation of the perfluorocarbon monomer used as one of the starting materials involves a number of steps and costs much. A process has been proposed to produce an ion exchange membrane by grafting a sulfonyl-containing monomer onto a fluorovinyl polymer (see Japanese Patent Public Disclosure No. 32289/75), but since the perfluorocarbon polymer is generally less inert to radiation and is less susceptible to grafting of monomers and because the monomer to be grafted does not penetrate deep into the polymer, it has been technically difficult to have the monomer grafted uniformly in the interior of a perfluorocarbon polymer substrate. It is therefore difficult in the state of the art to produce a uniform cation exchange membrane with small electrical resistance by the process described in Japanese Patent Public Disclosure No. 32289/75.

SUMMARY OF THE INVENTION

Therefore, the main object of the present invention is to provide a uniform cation exchange membrane that can be manufactured at low cost and which exhibits small electrical resistance and great physical strength when used principally in electrolysis of water.

Another object of the present invention is to provide a cation exchange membrane having a certain fluorovinyl sulfonic acid monomer grafted onto a certain high-molecular substrate film.

The other objects and advantages of the present invention will become apparent from the following description.

DETAILED DESCRIPTION OF THE INVENTION

The present invention relates to a cation exchange membrane. More particularly, the invention relates to a cation exchange membrane having a certain fluorovinyl sulfonic acid monomer grafted onto a certain high-molecular substrate film. The cation exchange membrane of the present invention is particularly suitable for use in electrolysis of pure water, aqueous alkaline solution, as well as aqueous solutions of sulfuric acid, sodium sulfate and organic compounds.

The cation exchange membrane of the present invention is produced by grafting under exposure to ionizing radiation a fluorovinyl sulfonic acid monomer onto a substrate film made of a homopolymer or copolymer of a monomer of the formula: $CH_2=CXY$ (wherein X is hydrogen, fluorine or $CH_3$; and Y is hydrogen or fluorine).

The term "high-molecular substrate film" as used herein generically means all articles shaped into a thin flat form. In the plastics industry, films are distinguished from sheets by their thickness, but it is to be understood that for the purpose of the present invention, the term "film" includes what would otherwise be called "sheets". The high-molecular substrate film may be supported by a reinforcing material, which is made of, say, Teflon fiber, poly(ethylenetetrafluoroethylene) fiber, polyvinyl chloride fiber, polyolefin fiber, or poly(vinyl chloride-vinylidene chloride).

To provide a desired cation exchange membrane at fairly low cost, the present inventors chose a process wherein a cation exchange group was introduced into a preformed high-molecular substrate film, and examined which combination of high-molecular substrate films and cation exchange group containing monomers to be grafted was the best in consideration of the ease of grafting, the performance of the resulting cation exchange membrane and economy. As a result, the present inventors have found that the high-molcular substrate film that must have high activity to radiation must contain hydrogen as a group to be attached to the carbon chain, that such activity is increased with increasing hydrogen content, and that the hydrogen film of this nature is satisfactory as a membrane substrate since it is resistant to oxidation by hydrogen peroxide or a redox catalyst that otherwise deteriorates a cation exchange membrane being used in electrolysis of water. Therefore, the high-molecular film used as a substrate in the present invention is a homopolymer or copolymer of $CH_2=CH_2$, $CH_2=CH.CH_3$, $CH_2=CHF$, $CH_2=CF.CH_3$ and $CH_2=CF_2$. Polyethylene is most preferred in the present invention.

It has also been found that while the hydrocarbon polymer substrate is resistant to deterioration during electrolysis, the ion exchange group consisting monomer to be introduced into the substrate desirably contains as much fluorine as possible and the least possible hydrogen content to have maximum resistance to deterioration. Furthermore, to provide a cation exchange membrane having small electrical resistance, it is necessary to introduce a monomer containing sulfonil group which can be converted into a strong acid group after grafting. For these reasons, the present invention uses fluorovinyl sulfonic acid monomers as the monomer to be grafted onto the high-molecular substrate film. These monomers are represented by the following formulae:

  (a)

  (b)

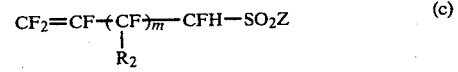  (c)

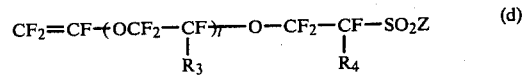  (d)

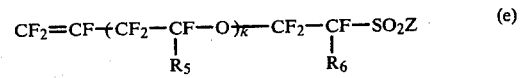  (e)

(wherein n is 0 or 2; m is an integer of 1 to 5; l and k are each an integer of 1 to 3; Z is fluorine, hydroxyl, $NH_2$, $ONH_4$ or OM, M being an alkali metal; $R_1$ and $R_2$ are each fluorine or a perfluoroalkyl group having 1 to 5 carbon atoms; $R_3$ and $R_5$ are each fluorine or $CF_3$; $R_4$ and $R_6$ are each fluorine or a perfluoroalkyl group having 1 to 10 carbon atoms).

Various methods for preparing these monomers are described in prior art references such as U.S. Pat. Nos. 3,041,317, 3,282,875, 3,714,245, 3,718,627, and Japanese Patent Publication Nos. 7949/66 and 12408/68.

According to the present invention, the fluorovinyl sulfonic acid monomer is grafted onto the high-molecular substrate film by exposure to ionizing radiation, and sources of the ionizing radiation are α-rays, β-rays, γ-rays and accelerated electron beams. Because of easy handling and grafting on a commercial basis, γ-rays and accelerated electron beams are preferred.

The graft polymerization to produce the cation exchange membrane of the present invention is performed by any of the following three methods:

(a) a high-molecular substrate film that has been exposed to ionizing radiation is brought into contact with a solution of a fluorovinyl sulfonic acid monomer;

(b) a high-molecular substrate film is brought into contact with a solution of a fluorovinyl sulfonic acid monomer, and the mixture is then exposed to ionizing radiation; and (c) a high-molecular substrate film that has been exposed to ionizing radiation is brought into contact with a solution of a fluorovinyl sulfonic acid monomer, and the mixture is again exposed to ionizing radiation.

These methods can be performed in combination if the type of the substrate or monomer, or the desired graft ratio so requires. The high-molecular substrate film can be brought into contact with the solution of fluorovinyl sulfonic acid monomer by various methods such as spraying, brushing and immersion, but usually, immersion of the substrate in the monomer solution is preferred. To achieve thorough impregnation of the substrate with the monomer, a solvent miscible with the monomer, such as benzene, toluene, xylene, ethylene dichloride or perfluorocarbon solvent, may be used.

The dose of ionizing radiation varies with the irradiation conditions such as atmosphere and temperature, as well as the type of the substrate and monomer, and usually, a dose of 0.5 to 50 Mrad is suitable. The irradiation atmosphere may consist of air, inert gas or any suitable gas, but to achieve efficient graft polymerization, an inert gas is preferred. After the fluorovinyl sulfonic acid monomer is grafted onto the high-molecular substrate film, the film is washed with toluene or other solvents to remove the unreacted monomer or homopolymer. If a monomer containing $-SO_2F$ group is used as the fluorovinyl sulfonic acid monomer, it may be reacted, after grafting, with ammonia, alkali hydroxide or an inorganic acid to convert the $-SO_2F$ group to $-SO_2NH_2$ group, $-SO_3M$ group (M is an alkali metal) or $-SO_3H$ group, and if necessary, the $-SO_3H$ group may be further reacted with ammonia to be converted to $-SO_3NH_4$ group.

If the substrate is made of a hydrocarbon polymer having a small number of fluorine atoms that are attached to the carbon chain, the desired graft polymerization occurs easily and the ion exchange group is introduced into the substrate uniformly, and as a result, a uniform cation exchange membrane having small electrical resistance is produced. By combining such substrate with the fluorovinyl sulfonic acid monomer, a membrane that is sufficiently resistant to oxidative deterioration can be produced.

Another advantage of the present invention that grafts a fluorovinyl sulfonic acid monomer onto a hydrocarbon polymer film is its great economy because it provides a cation exchange membrane at low cost.

The construction and advantges of the present invention are now described in greater detail by reference to the following non-limiting examples and comparative example, wherein all parts are by weight.

EXAMPLE 1

A low-density polyethylene (ASAHI DOW "F-2135") film 100μ thick was irradiated with electron beams from a resonance transformer electron beam accelerator (2 MV, 1 mA) to give a total dose of 10 Mrad. The polyethylene film was then put in a reaction vessel which was evacuated to $10^{-4}$ mmHg and charged with $CF_2=CFSO_2F$ in which the dissolved oxygen had been replaced by nitrogen. The polyethylene film thus immersed in $CF_2=CFSO_2F$ was held at room temperature for 5 hours to perform graft polymerization. After the reaction, the film was taken out of the vessel, washed with toluene to remove the unreacted monomer, and dried. The dried film had a graft ratio of 53%.

The film was then immersed in a solution (55 parts of methanol, 40 parts of water and 5 parts of NaOH) at 80° C. for 24 hours. The so treated film had an electrical resistance of 3.6 Ω.cm² as measured in 0.5 N NaCl (25° C.) at 1 KHz a.c., and an ion exchange capacity of 1.9 meg/g-dry resin wt. The film was immersed in 3% aqueous $H_2O_2$ containing 4 ppm of Mohr's salt at 75° C. for 24 hours. The weight of the film was decreased by 0.3% and its electrical resistance was 3.6 Ω.cm².

EXAMPLE 2

A grafted film was produced as in Example 1 except that a polyvinyl fluoride (du PONT "TEFLER") film 100μ thick was used as a substrate. The film had a graft ratio of 37%, an electrical resistance of 4.4 Ω.cm², and an ion exchange capacity of meg/g-dry resin wt. The film was immersed in aqueous $H_2O_2$ as in Example 1. Its weight was decreased by 0.5% and its electrical resistance was 4.5 Ω.cm².

EXAMPLE 3

Two low-density polyethylene (Asahi Glass Co., Ltd. "AFLON") films 25μ and 50μ thick were reinforced with an intervening net (NBC Kogyo CO., Ltd. "AF-40" percent opening: Ca. 50%) of tetrafluoroethylene and ethylene copolymer monofilaments, and hot-pressed at 165° C. and 200 Kg/cm² for 5 minutes to provide a film 100μ thick. The film was subjected to graft polymerization and alkali-treatment as in Example 1. The resulting film had a graft ratio of 44%, an ion exchange capacity of 1.4 meg/g-dry resin wt, and an electrical resistance of 4.1 Ω.cm². The film was then immersed in aqueous $H_2O_2$ as in Example 1; its weight was decreased by 0.2% and its electrical resistance was 4.2 Ω.cm².

EXAMPLE 4

A high-density polyethylene (ASAHI CHEMICAL INDUSTRY CO., LTD. "F-400") film 120μ thick was immersed in a mixed solution comprising 20 parts of $CF_2=CF-CF_2-CFH-SO_2F$ and 80 parts of toluene, and the reaction system was purged of air by freeze-evacuation to $10^{-4}$ mmHg. The film was irradiated with $\gamma$-rays from Co-60 in a dose rate of $1\times 10^5$ rad/hr for 10 hours at room temperature. The grafted film was recovered from the monomer solution, washed with toluene thoroughly and dried. The film had a graft ratio of 38%.

The film was then immersed in a mixture of 50 parts of dimethyl sulfoxide, 40 parts of water and 10 parts of NaOH for 8 hours at 40° C., and its electrical resistance was measured as in Example 1. The film had an electrical resistance of 3.8 $\Omega.cm^2$ and an ion exchnge capacity of 1.0 meg/g-dry resin wt. When the film was immersed in aqueous $H_2O_2$ as in Example 1, its weight was decreased by 0.3% and its electrical resistance was 3.9 $\Omega.cm^2$.

EXAMPLE 5

A low-density polyethylene (ASAHI DOW "F-2135") film 80µ thick was irradiated with electron beams as in Example 1 to give a total dose of 5 Mrad. The film was immersed in a mixed solution made of 40 parts of

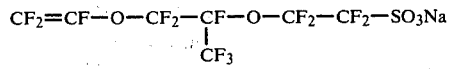

containing 0.25% of Mohr's salt and 60 parts of water (the content of dissolved oxygen in the solution had been reduced to 0.5 ppm or less by nitrogen bubbling) and the reaction mixture was held at room temperature for 5 hours. The grafted film was thoroughly washed with water and dried. The resulting film had a graft ratio of 75%. Its electrical resistance was measured as in Example 1 and was found to be 4.9 $\Omega.cm^2$. Its ion exchange capacity was 0.85 meg/g-dry resin wt. The film was immersed in aqueous $H_2O_2$ as in Example 1; its weight was reduced by 0.2% and its electrical resistance was 4.9 $\Omega.cm^2$.

EXAMPLE 6

A high-density polyethylene film (ASAHI CHEMICAL INDUSTRY CO., LTD., "F-400") 100µ thick and a reinforcing net of fluorine-containing copolymer the same as used in Example 3 were hot-pressed at 170° C. and 200 Kg/cm² for 10 minutes to provide a composite film 115µ thick. The film was immersed in a mixed solution consisting of 40 parts of

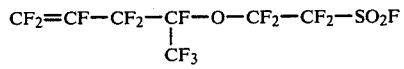

containing Mohr's salt, 10 parts of ethanol and 50 parts of water, and the content of dissolved oxygen was reduced to 0.5 ppm or less by nitrogen bubbling. The reaction mixture was then irradiated with $\gamma$-rays from Co-60 in a dose rate of $5\times 10^5$ rad/hr for 3 hours. Throughout the irradiation, the reaction mixture was held at 30° C. in a constant temperature bath. The resulting film was alkali-treated as in Example 4, and its graft ratio and electrical resistance were 65% and 5.1 $\Omega.cm^2$, respectively. The film had an ion exchange capacity of 0.83 meg/g-dry resin wt. When the film was treated in aqueous $H_2O_2$ as in Example 1, its weight was reduced by 0.2% and its electrical resistance was 5.1 $\Omega.cm^2$.

EXAMPLE 7

A polyvinyl fluoride (PVF) (du PONT "TELER") film 100µ thick and a polyvinylidene fluoride (PVDF) (PENWALT "KYNAR") film 150µ thick were subjected to graft polymerization as in Example 1. The graft ratio was 42% for the PVF film, and 48% for the PVDF film. The two grafted films were alkali-treated by immersion in a mixture of 60 parts of methanol, 35 parts of water and 5 parts of NaOH at 80° C. for 24 hours. The electrical resistance of the respective films was measured as in Example 1, and it was 3.7 $\Omega.cm^2$ for the PVF film and 3.5 $\Omega.cm^2$ for the PVDF film. They had an ion exchange capacity of 1.5 meg/g-dry resin wt) (PVF film) and 1.5 meg/g-dry resin wt (PVDF film). The film were then treated with aqueous $H_2O_2$ as in Example 1, and their weight loss and electrical resistance were 0.3% and 3.7 $\Omega.cm^2$ for the PVF film, and 0.4% and 3.6 $\Omega.cm^2$ for the PVDF film.

EXAMPLE 8

A grafted film was prepared as in Example 1 except that $CF_2=CFSO_2F$ was replaced by $CF_3-CF=CFSO_2F$. The film had a graft ratio of 40%, an ion exchange capacity of 1.4 meg/g-dry resin wt and an electrical resistance of 3.5 $\Omega.cm^2$. When the film was treated with aqueous $H_2O_2$, its weight was decreased by 0.2% and its electrical resistance was 3.5 $\Omega.cm^2$.

EXAMPLE 9

A grafted film was prepared as in Example 1 except that a polypropylene (available from MITSUI PETROCHEMICAL INDUSTRIES, LTD.) film 100µ thick was used as a substrate. The product film had a graft ratio of 48%, an electrical resistance of 4.0 $\Omega.cm^2$ and an ion exchange capacity of 1.7 meg/g-dry resin wt. The film was treated with aqueous $H_2O_2$ as in Example 1, but the change in its weight and electrical resistance was substantially zero.

COMPARATIVE EXAMPLE

A polytetrafluoroethylene substrate (Nitto Denki Kogyo "NITOFLON No. 900") film 80µ thick was irradiated with electron beams as in Example 1 to give a total dose of 10 Mrad. Then, $CF_2=CFSO_2F$ was grafted onto the substrate film to provide a film having a graft ratio of 1.3%. The film was immersed in a mixture of 40 parts of dimethyl sulfoxide, 55 parts of water and 5 parts of KOH at 40° C. for 8 hours. An XMA analysis of a cross section of the film showed that the monomer was grafted only to the film surface. To achieve increased graft ratio and provide a film having the monomer grafted deep into the interior, the above procedure was repeated except that the radiation dose was increased to 30 Mrad. But due to radioactive deterioration, the film cracked when it was hydrolyzed, and subsequent handling of the film was difficult. It therefore turned out that a practically feasible cation exchange membrane having the specified fluorovinyl sulfonic acid monomer grafted uniformly into the interior of a radioactive degradable substrate was very difficult to obtain without impairing the mechanical properties of the substrate.

What is claimed is:

1. A cation exchange membrane having a fluorovinyl sulfonic acid monomer grafted onto a high-molecular substrate film having a monomer of the formula:

$$\begin{array}{c} H \quad X \\ | \quad | \\ C=C \\ | \quad | \\ H \quad Y \end{array}$$

(wherein X is hydrogen, fluorine or CH$_3$, and Y is hydrogen or fluorine) as a monomer unit.

2. A cation exchange membrane according to claim 1 wherein the fluorovinyl sulfonic acid monomer has the formula: CF$_2$=CF–(CF$_2$)$_n$SO$_2$Z (wherein n is 0 or 2, and Z is fluorine, hydroxyl group, NH$_2$, ONH$_4$ or OM, M being an alkali metal).

3. A cation exchange membrane according to claim 1 wherein the fluorovinyl sulfonic acid monomer has the formula: R$_1$—CF=CF–SO$_2$Z (wherein R$_1$ is fluorine or a perfluoroalkyl group having 1 to 5 carbon atoms).

4. A cation exchange membrane according to claim 1 wherein the fluorovinyl sulfonic acid monomer has the formula:

$$CF_2=CF{\text -}(CF)_{\overline{m}}CFH{\text -}SO_2Z$$
$$\quad\quad\quad\quad\quad | \\ \quad\quad\quad\quad\quad R_2$$

(wherein R$_2$ is fluorine or a perfluoroalkyl group having 1 to 5 carbon atoms).

5. A cation exchange membrane according to claim 1 wherein the fluorovinyl sulfonic acid monomer has the formula:

$$CF_2=CF{\text -}(O{\text -}CF_2{\text -}CF)_{\overline{l}}O{\text -}CF_2{\text -}CF{\text -}SO_2Z$$
$$\quad\quad\quad\quad\quad\quad | \quad\quad\quad\quad\quad\quad |\\ \quad\quad\quad\quad\quad\quad R_3 \quad\quad\quad\quad\quad\quad R_4$$

(wherein R$_3$ is fluorine or CH$_3$; R$_4$ is fluorine or a perfluoroalkyl group having 1 to 10 carbon atoms; and l is an integer of 1 to 3).

6. A cation exchange membrane according to claim 1 wherein the fluorovinyl sulfonic acid monomer has the formula:

$$CF_2=CF{\text -}(CF_2{\text -}CF{\text -}O)_{\overline{k}}CF_2{\text -}CF{\text -}SO_2Z$$
$$\quad\quad\quad\quad\quad\quad\quad | \quad\quad\quad\quad\quad\quad |\\ \quad\quad\quad\quad\quad\quad\quad R_5 \quad\quad\quad\quad\quad\quad R_6$$

(wherein R$_5$ is fluorine or CH$_3$; R$_6$ is fluorine or a perfluoroalkyl group having 1 to 10 carbon atoms; and k is an integer of 1 to 3).

7. A cation exchange membrane according to claim 1 wherein the high-molecular substrate film is supported by a reinforcing material.

8. A process for producing a cation exchange membrane wherein a high-molecular substrate film having a monomer of the formula: CH$_2$=CXY (wherein X is hydrogen, fluorine or CH$_3$; and Y is hydrogen or fluorine) as a monomer unit is exposed to ionizing radiation, and then the substrate film is brought into contact with a solution of a fluorovinyl sulfonic acid monomer so as to graft the fluorovinyl sulfonic acid monomer onto the substrate film.

9. A process according to claim 8 wherein the dose of ionizing radiation is from 0.5 to 50 Mrad.

10. A process according to claim 8 wherein the substrate film is exposed to the ionizing radiation in the presence of an inert gas.

11. A process according to claim 8 wherein the exposed substrate film is brought into contact with the solution of fluorovinyl sulfonic acid monomer in the presence of a solvent which is miscible with said monomer.

12. A process for producing a cation exchange membrane wherein a high-molecular substrate film having a monomer of the formula: CH$_2$=CXY (wherein X is hydrogen, fluorine or CH$_3$; and Y is hydrogen or fluorine) as a monomer unit is brought into contact with a solution of a fluorovinyl sulfonic acid monomer, and then the mixture is exposed to ionizing radiation to give a total dose of 0.5 to 20 Mrad so as to graft the fluorovinyl sulfonic acid monomer onto the substrate film.

13. A process according to claim 1 wherein the substrate film is exposed to the ionizing radiation in the presence of an inert gas.

14. A process according to the claim 13 wherein the substrate film is brought into contact with the solution of fluorovinyl sulfonic acid monomer in the presence of a solvent that is miscible with said monomer.

15. A process for producing a cation exchange membrane wherein a high-molecular substrate film having a monomer of the formula: CH$_2$=CXY (wherein X is hydrogen, fluorine or CH$_3$; Y is hydrogen or fluorine) as a monomer unit is exposed to ionizing radiation to give a total dose of 0.5 to 20 Mrad, the substrate film is then brought into contact with a solution of a fluorovinyl sulfonic acid monomer, and the substrate film is further exposed to ionizing radiation to give a total dose of 0.5 to 20 Mrad so as to graft the fluorovinyl sulfonic acid monomer onto the substrate film.

16. A process according to claim 15 wherein the substrate film given the first dose of ionizing radiation is brought into contact with the solution of fluorovinyl sulfonic acid monomer in the presence of a solvent that is miscible with said monomer.

17. A process according to claim 15 wherein the substrate film is exposed to ionizing radiation in the presence of an inert gas.

18. A cation exchange membrane according to claim 1 of a polymer having repeating units $$\begin{array}{c} H \quad X \\ | \quad | \\ {\text -}C{\text -}C{\text -} \\ | \quad | \\ H \quad Y \end{array}$$

and wherein said fluorovinyl sulfonic acid monomer is uniformly grafted thereto throughout said polymer.

* * * * *